US012792255B2

(12) United States Patent
Hahn et al.

(10) Patent No.: US 12,792,255 B2
(45) Date of Patent: Nov. 10, 2026

(54) DATA STORAGE DEVICE AND METHOD FOR ON-THE-FLY MATHEMATICAL PROCESSING OF DATA READ FROM THE DATA STORAGE DEVICE

(71) Applicant: Sandisk Technologies, Inc., Milpitas, CA (US)

(72) Inventors: Judah Gamliel Hahn, Ofra (IL); Ariel Navon, Revava (IL); Alexander Bazarsky, Holon (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/904,260

(22) Filed: Oct. 2, 2024

(65) Prior Publication Data

US 2026/0093412 A1 Apr. 2, 2026

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | | |
|---|---|---|---|---|
| 5,373,376 A * | 12/1994 | Dethardt | G06T 3/4007 358/500 |
| 7,788,220 B1 * | 8/2010 | Auchmoody | G06F 16/10 707/783 |
| 7,961,239 B2 * | 6/2011 | Lee | H04N 23/843 348/311 |
| 9,753,962 B2 | 9/2017 | Petschulat et al. | |
| 10,366,247 B2 | 7/2019 | Beecham et al. | |
| 10,534,799 B1 * | 1/2020 | Gupta | G06F 16/285 |
| 11,223,543 B1 * | 1/2022 | Fauber | G06F 18/10 |
| 11,480,639 B1 * | 10/2022 | Zhong | G01R 33/4824 |

(Continued)

OTHER PUBLICATIONS

U.S. Appl. No. 18/640,166, filed Apr. 19, 2024, entitled "Data Storage Device and Method for Data Processing Optimization for Computational Storage.".

(Continued)

*Primary Examiner* — Charles Rones
*Assistant Examiner* — Huen Wong
(74) *Attorney, Agent, or Firm* — Crowell & Moring LLP

(57) ABSTRACT

A data storage device is provided comprising one or more memories and one or more processors. The one or more processors, individually or in combination, are configured to: receive, from a host, a data set and configuration information for the data set, wherein the configuration information comprises an identification of logical addresses of values in the data set; store the data set and the configuration information in the one or more memories; receive, from the host, a read request for the data set, wherein the data set comprises a missing value; and in response to receiving the read request: perform on-the-fly interpolation of a value for the missing value from neighboring values of the missing value that are identified using the configuration information; and send, to the host, the data set with the interpolated value.

18 Claims, 10 Drawing Sheets

(56) References Cited

U.S. PATENT DOCUMENTS

| | | | | |
|---|---|---|---|---|
| 11,480,683 | B1* | 10/2022 | Matta | G01S 17/89 |
| 11,611,441 | B2 | 3/2023 | Beecham et al. | |
| 11,775,873 | B2 | 10/2023 | Wang et al. | |
| 2001/0020219 | A1* | 9/2001 | Kishlock | H02J 3/008 702/61 |
| 2003/0067043 | A1* | 4/2003 | Zhang | G11C 7/18 257/390 |
| 2003/0165051 | A1* | 9/2003 | Kledzik | H01L 25/0657 257/E25.011 |
| 2005/0030394 | A1* | 2/2005 | Mendis | H04N 25/68 348/E5.081 |
| 2006/0112188 | A1* | 5/2006 | Albanese | H04L 63/08 709/238 |
| 2010/0183237 | A1* | 7/2010 | Yamanaka | G06T 3/4007 382/260 |
| 2012/0262167 | A1* | 10/2012 | Lai | G01R 33/5611 324/309 |
| 2013/0321672 | A1* | 12/2013 | Silverstein | H04N 25/67 348/E5.022 |
| 2013/0322745 | A1* | 12/2013 | Lim | H04N 23/88 382/162 |
| 2014/0231954 | A1 | 8/2014 | Lue | |
| 2014/0317516 | A1* | 10/2014 | Doubleday | G01C 21/3874 715/738 |
| 2015/0293986 | A1 | 10/2015 | Verge | |
| 2015/0334264 | A1* | 11/2015 | Matsuno | H04N 1/215 348/231.1 |
| 2016/0078027 | A1* | 3/2016 | Katsuki | G06F 18/2163 707/693 |
| 2016/0239597 | A1* | 8/2016 | Shimizu | G06F 30/23 |
| 2017/0024144 | A1* | 1/2017 | Hrischuk | G06F 3/0629 |
| 2017/0076768 | A1 | 3/2017 | Son | |
| 2017/0161661 | A1* | 6/2017 | Dannecker | G06F 3/0604 |
| 2017/0201517 | A1* | 7/2017 | Gazdzinski | G06Q 20/405 |
| 2018/0068033 | A1* | 3/2018 | Bandyopadhyay | G01R 22/10 |
| 2019/0129834 | A1 | 5/2019 | Purkayastha | |
| 2019/0205774 | A1* | 7/2019 | Ba | G06N 20/20 |
| 2019/0259112 | A1* | 8/2019 | Siegman | G06F 16/29 |
| 2020/0004843 | A1* | 1/2020 | Valegerepura | G01C 21/20 |
| 2020/0310986 | A1 | 10/2020 | Kang | |
| 2021/0255786 | A1 | 8/2021 | Mendiola et al. | |
| 2021/0294805 | A1 | 9/2021 | Damodaran et al. | |
| 2022/0261317 | A1 | 8/2022 | Vijayan | |
| 2022/0309549 | A1 | 9/2022 | Xu et al. | |
| 2023/0017878 | A1* | 1/2023 | Ho | G06F 40/205 |
| 2023/0342280 | A1* | 10/2023 | Dar | G06F 3/0653 |

OTHER PUBLICATIONS

Emmanuel, T et al.; "A survey on missing data in machine learning"; downloaded from the Internet on Oct. 1, 2024 at A survey on missing data in machine learning | Journal of Big Data | Full Text (springeropen.com); Journal of Big Data; Dec. 2021; 37 pages.

Ma, D. et al.; "Dr. DNA: Combating Silent Data Corruptions in Deep Learning using Distribution of Neuron Activations"; downloaded from the Internet on Oct. 1, 2024 at 3620666.3651349 (acm.org); InProceedings of the 29th ACM International Conference on Architectural Support for Programming Languages and Operating Systems, vol. 3; Apr. 27, 2024; 14 pages.

"Nvm Express® Computational Programs Command Set Specification"; Revision 1.0; downloaded from the Internet on Oct. 1, 2024 at https://nvmexpress.org/wp-content/uploads/NVM-Express-Computational-Programs-Command-Set-Specification-1.0-2023.12.20.pdf; NVM Express, Inc.; Dec. 20, 2023; 40 pages.

"Nvm Express® Computational Programs Command Set Specification"; Revision 1.0a; downloaded from the Internet on Oct. 1, 2024 at https://nvmexpress.org/wp-content/uploads/NVM-Express-Computational-Programs-Command-Set-Specification-1.0a-2024.07.09-Ratified.pdf; NVM Express, Inc.; Jul. 9, 2024; 40 pages.

International Search Report mailed Jul. 16, 2025 for International Application No. PCT/US2025/011190.

Written Opinion mailed Jul. 16, 2025 for International Application No. PCT/US2025/011190.

Notice of Allowance mailed Nov. 3, 2025 for U.S. Appl. No. 18/640,166.

Xu et al.; "Frequen Access Pattern-based Prefetching Inside of Solid-State Drives"; 2020 Design, Automation & Test in Europe Conference & Exhibition (Date); Grenoble, France; 2020; pp. 720-725.

* cited by examiner

DATA STORAGE DEVICE AND METHOD FOR ON-THE-FLY MATHEMATICAL PROCESSING OF DATA READ FROM THE DATA STORAGE DEVICE

BACKGROUND

A data storage device can be used to store a database (or other data structure), which can be read by a host. When processing the database for data analysis, the host may need for perform value replacement (e.g., the completion and/or replacing of missing values inside the database when a "not a number (NaN)" is written instead of a value). After the host reads the database from the data storage device, the host can replace the NaN values with some default values, such as 0 or an average column value.

DETAILED DESCRIPTION

Figure 1A:
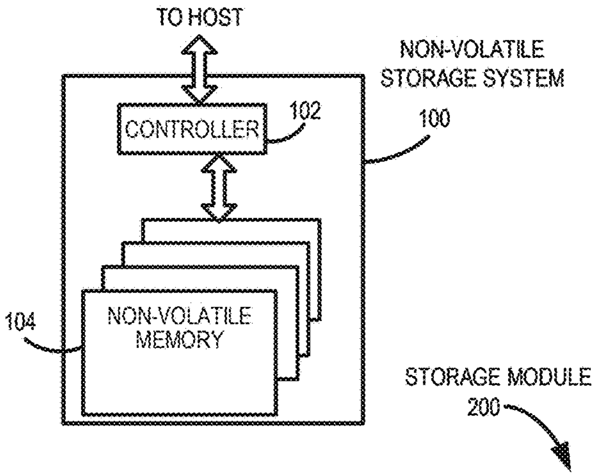
FIG. 1A is a block diagram of a data storage device of an embodiment.

The following embodiments generally relate to a data storage device and method for on-the-fly mathematical processing of data read from the data storage device. In one embodiment, a data storage device is provided comprising one or more memories; and one or more processors. The one or more processors, individually or in combination, are configured to: receive, from a host, a data set and configuration information for the data set, wherein the configuration information comprises an identification of logical addresses of values in the data set; store the data set and the configuration information in the one or more memories; receive, from the host, a read request for the data set, wherein the data set comprises a missing value; and in response to receiving the read request: perform on-the-fly interpolation of a value for the missing value from neighboring values of the missing value that are identified using the configuration information; and send, to the host, the data set with the interpolated value.

In some embodiments, the interpolation is performed using an interpolation method identified by the host.

In some embodiments, the interpolation method is identified by the host in the configuration information.

In some embodiments, the interpolation method is identified by the host in the read request.

In some embodiments, the configuration information further identifies a format of the data set.

In some embodiments, the data set and the configuration information are stored in a same memory of the one or more memories.

In some embodiments, the data set and the configuration information are stored in different memories of the one or more memories.

In some embodiments, the one or more processors, individually or in combination, are further configured to perform a filtering operation on the data set.

In some embodiments, the configuration information further comprises at least one property for the filtering operation.

In some embodiments, the one or more memories comprise a three-dimensional memory.

In another embodiment, a method is provided that is performed in a data storage device comprising a memory. The method comprises: storing, in the memory, a data set received from a host; receiving, from the host, a read request for the data set and a condition for sending the data set to the host; and in response to receiving the read request: performing on-the-fly analysis of the data set to determine whether the condition is satisfied; and sending the data set to the host only if the condition is satisfied.

In some embodiments, the on-the-fly analysis comprises comparing values in the data set to a threshold to produce discrete values from continuous data.

In some embodiments, the method further comprises performing on-the-fly interpolation of a value missing from the data set from neighboring values identified using logical address information of values in the data set.

In some embodiments, the interpolation is performed using an interpolation method identified by the host when sending the data set to the data storage device for storage.

In some embodiments, the interpolation method is identified by the host in the read request.

In some embodiments, the method further comprises performing a filtering operation on the data set.

In some embodiments, the on-the-fly analysis is performed by a math operation module in the data storage device.

In some embodiments, the sending of the data set is performed by a storage data processing control module in the data storage device.

In some embodiments, the memory comprises a three-dimensional memory.

In another embodiment, a data storage device is provided comprising: a memory; and means for performing on-the-fly interpolation of a value missing from a data set stored in the memory from neighboring values identified using logical address information of values in the data set.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1B:
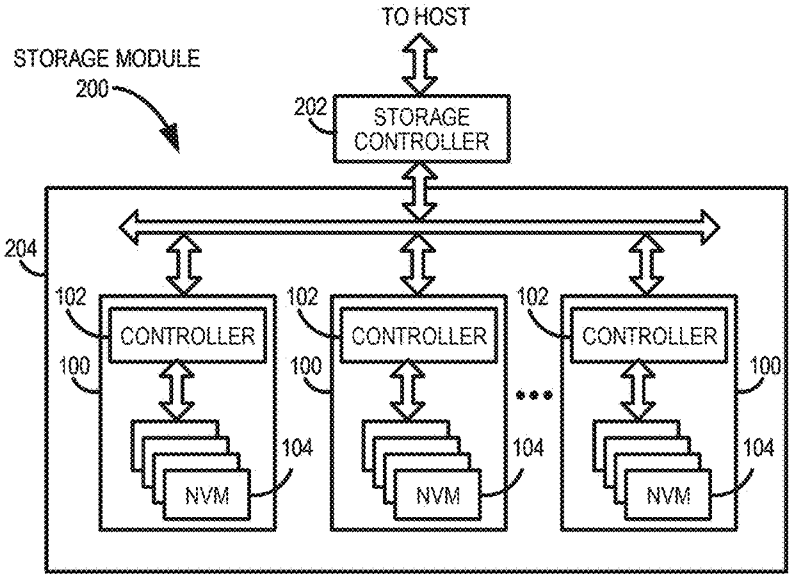
FIG. 1B is a block diagram illustrating a storage module of an embodiment.
Figure 1C:
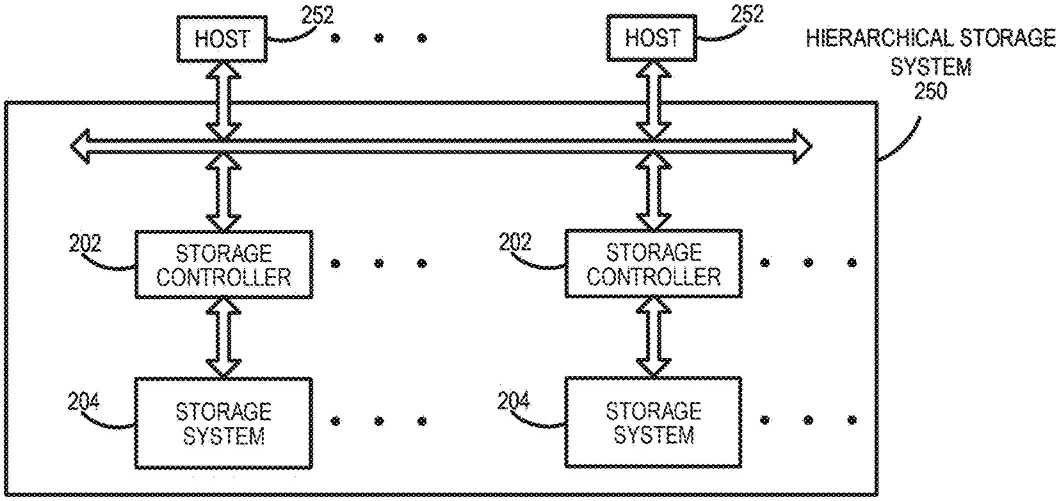
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
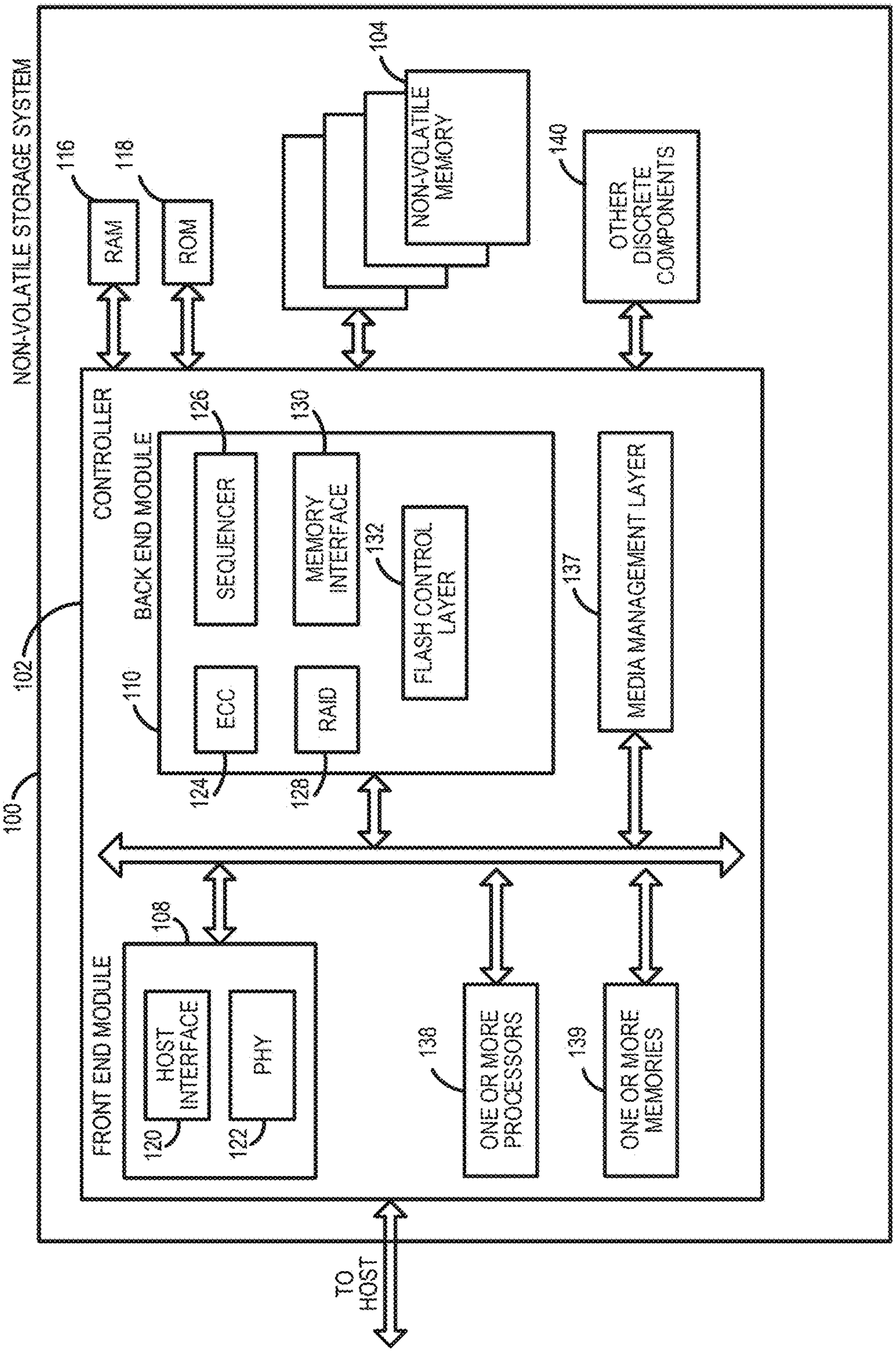
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
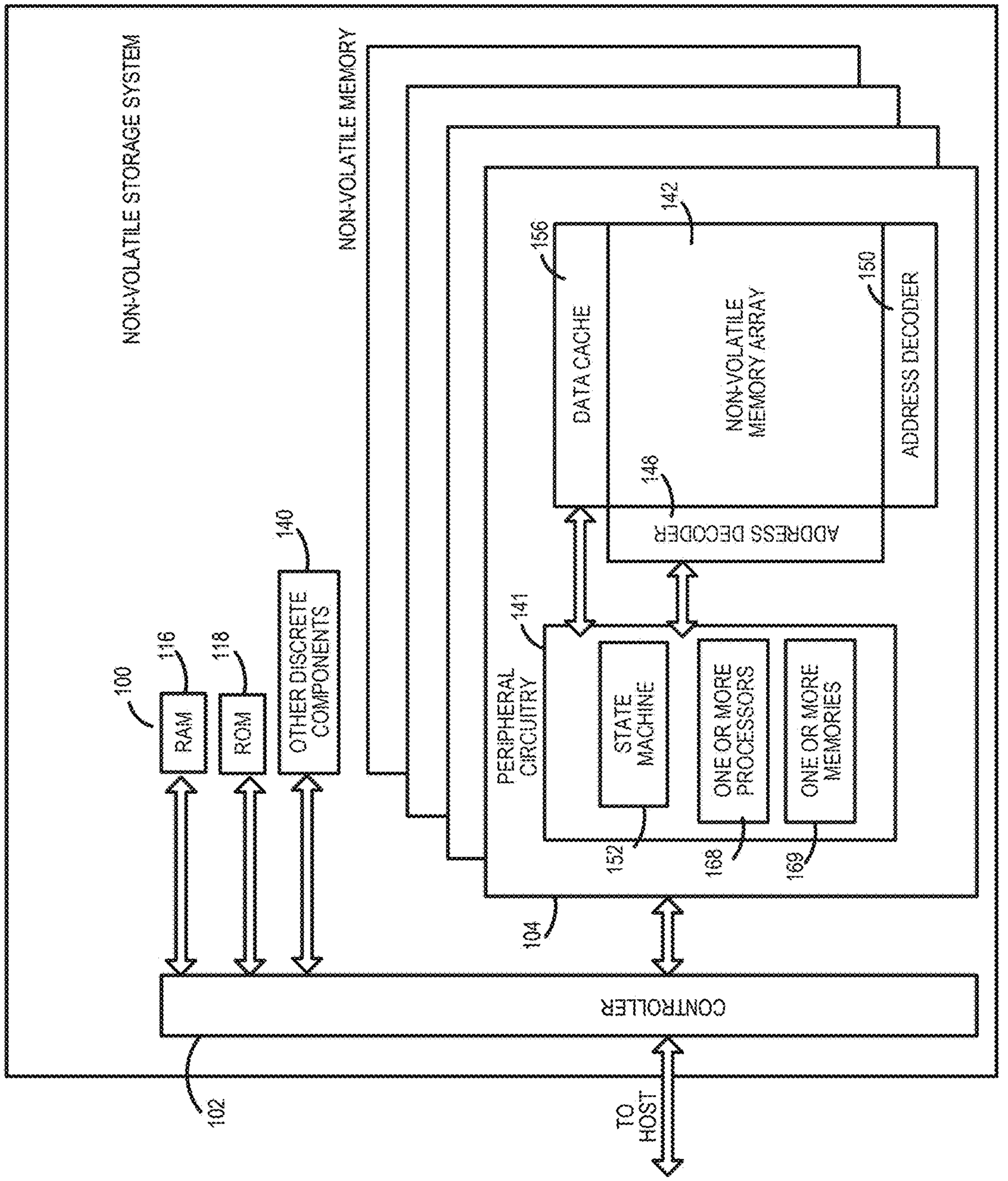
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
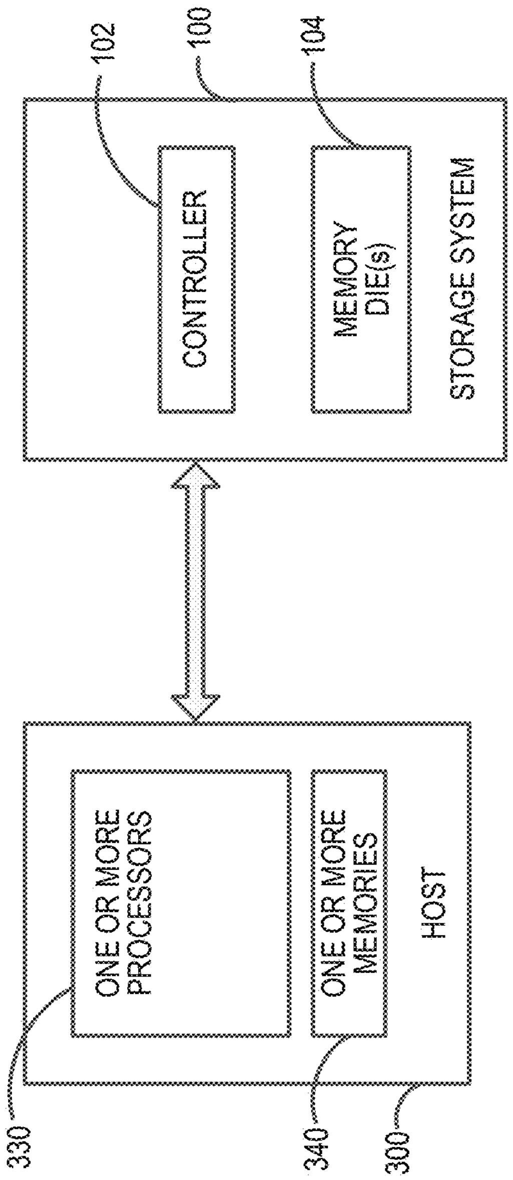
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a data storage device can be used to store a database (or other data structure), which can be read by a host. When processing the database for data analysis, the host may need to perform value replacement (e.g., the completion and/or replacing of missing values inside the database when a "not a number (NaN)" is written instead of a value). After the host reads the database from the data storage device, the host can replace the NaN values with some default values, such as 0 or an average column value. However, having the host perform the replacement after the database is loaded from the data storage device can require some effort and result in latency. Also, the database is seldom stored after the replacement is conducted, as there is value in keeping the original data without the replacement to distinguish between real values and replaced values.

In the following embodiments, the controller 102 of the data storage device 100 is configured to optimize this replacement procedure by performing missing-values pre-processing of a data structure (such as a database) stored in the memory 104 of the data storage device 100. These embodiments can reduce the latency and computational overhead of the value replacement operation. In one example implementation (other implementations can be used), the controller 102 is configured to optimize the replacement of specific patterns in the stored data structure. The following examples of this embodiment will be illustrated using a database, but it should be understood that data structures other than a database can be used.

In one example, the controller 102 of the data storage device 100 is configured to mark written replaceable patterns, so that the controller 102 can perform on-the-fly replacement of the patterns during a read operation. Patterns can take any suitable form, such as, but not limited to, specific characters, regular expressions, or a predefined bit sequence which is otherwise unused in a structure stored persistently in the memory 104 of the data storage device 100. For simplicity, this example will use a special character replacement, but it should be understood that the claims are not so limited unless expressly recited therein.

Figure 4:
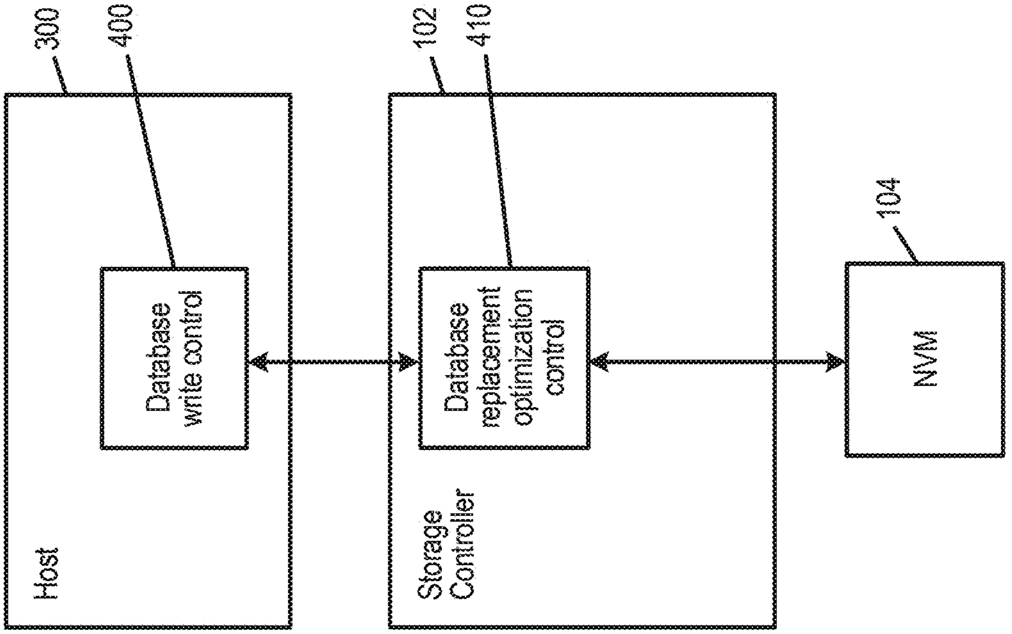
FIG. 4 is an illustration of an architecture of an embodiment.

FIG. 4 is an example architecture of an embodiment. As shown in FIG. 4, in this example, the host 300 comprises a database write control module 400, which can be provided by the host's one or more processors 330, individually or in combination, executing instruction code stored in the host's one or more memories 340. As also shown in FIG. 4, the data storage device's controller 102 in this example comprises a database replacement optimization control module 410, which can be provided by the controller's one or more processors 168, individually or in combination, executing instruction code stored in a memory of the data storage device 100. It should be understood that the database write control module 400 and the database replacement optimization control module 410 can be located in other locations (e.g., in a connecting layer between the controller 102 and the host 300).

In this example, when the host 300 is writing special characters that belong to the database, the database replacement optimization control module 410 can insert the locations of these special characters as meta-data. The locations can be stored in a page-plus-offset format or in a compressed format (e.g., if there is a long range of special characters). The indication to the locations of the special characters can hasten the replacement operation during the read of these characters. It should be noted that, in this example, the original data is stored fully in the memory 104, and the replacement is optional. The original data may be read if no replacement is requested by the database write/read control. This can also be denoted as a "computational" read with the replacement or as a "regular" read without the replacement.

The database write control module 400 can define the special characters or patterns to be used. For example, the sequence for "NaN" may be used in an integer field to indicate a value that is not a number, and the replacement to be used can be a 0 or 1.

Figure 5:
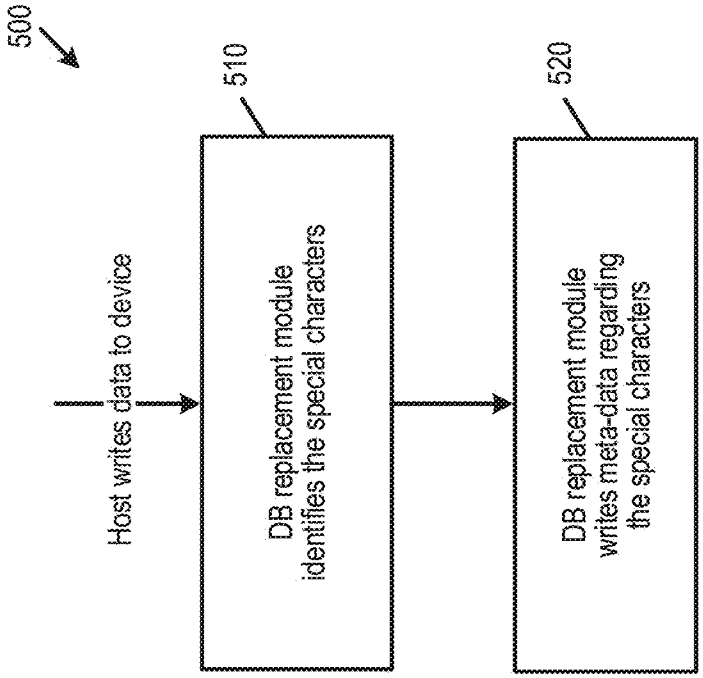
FIG. 5 is a flow chart for a write operation of an embodiment.

FIG. 5 is a flow chart 500 illustrating a write operation of an embodiment. As shown in FIG. 5, when the host 300 writes data to the data storage device 100, the controller 102 (e.g., using the database replacement module 410) identifies special characters in the data (act 510) and writes meta-data regarding the location of the special characters (act 520). Special characters can be defined by the host 300 through the database write control module 400. The replacement character for each special character, as well as the granularity of the data defined as "character," may also be defined through this interface.

Figure 6:
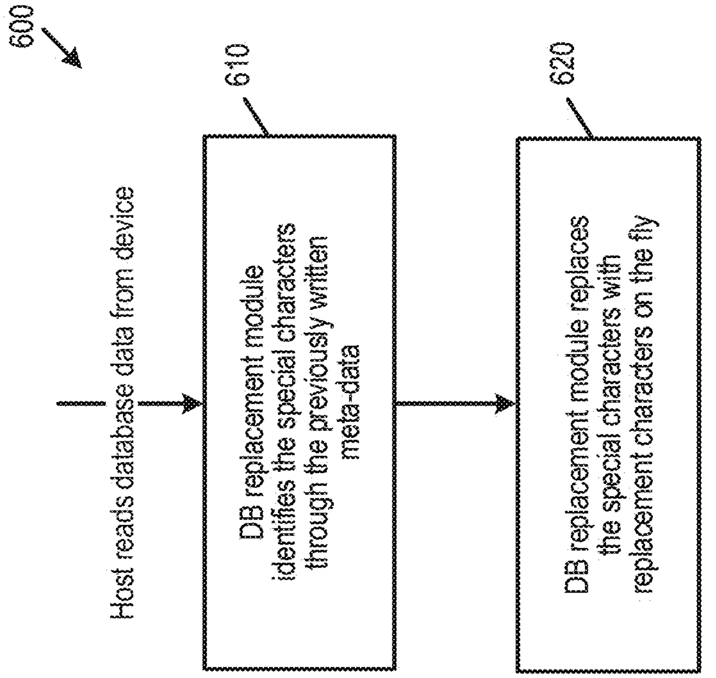
FIG. 6 is a flow chart for a read operation of an embodiment.

FIG. 6 is a flow chart 600 illustrating a read operation of an embodiment. As shown in FIG. 6, when the host 300 reads database data from the data storage device 100, the controller 102 (e.g., using the database replacement module 410) identifies special characters through the previously-written meta data (act 610) and replaces the special characters with replacement characters on-the-fly (act 620). So, in this example, when the database data is set to be read, the database replacement module 410 can read the meta data and replace each of the special characters in the read data with the replacement character. The meta data can be stored in the non-volatile memory 104 and loaded when the database write/read control module 400 indicates that the database will be read.

There are several advantages associated with these embodiments. For example, using these embodiments can reduce power consumption, latency, and host overhead when reading large databases. Computational storage is a highly sought after, and these improvements are beneficial.

There are many alternatives that can be used with these embodiments. For example, the database replacement module 410 can be integrated with the values of a key value (KV) database. The special characters can be represented as values of KV pairs, and their replacement may occur during the reading of the database.

Also, if the replacement changes the length of the payload, the replacement algorithm can indicate this as part of the read operation. For example, the database read operation may be required to allocate additional buffers if the replacement increases the payload size. Since logical block addressees (LBAs) are fixed-length, a padding replacement can be used in this instance. For example, whitespace defined in a comma-separated value (CSV) file may be reduced to allow for replacements of variable length in a field. If the replacement cannot fit into the buffer provided by the host 300, the computational protocol may indicate additional buffer spaces that can be used for this purpose. Also, computational read can be performed using a different memory buffer than a standard read. Embodiments can leverage NVMe Computational Programs Command Set Specification, Revision 1.0a, Jul. 9, 2024, to address the communication between the host 300 and the data storage device 100.

The above embodiments presented the concept of internal replacement of specific characters/patterns stored in a data storage device. This internal replacement can be part of data pre-processing, which is very common in statistics, data analysis, and machine-learning applications. As described above, on-the-fly replacement of patterns can be made during a host read operation, which may include either specific characters, regular expressions, and/or a predefined bit sequence that is otherwise unused in a structure stored persistently in a data storage device.

A common use case for those embodiments is the completion and/or replacement of missing values inside a data structure (e.g., database), such as replacing NaNs (which represent missing values in the database) with either a default value (e.g., 0) or an average column value. Previously, the host would perform the replacement after the database was loaded, which would require CPU overhead and increase latency. The above embodiments presented a method of internal completion of these values inside the storage memory, which reduces the latency and computational overhead of this common operation. These embodiments were presented in U.S. application Ser. No. 18/640,166, which is hereby incorporated by reference.

However, more-complex non-singular pre-processing operations may still need to be done in the host, such as calculations done on several data points together as well as other mathematical data transformations (e.g., interpolation of missing datapoints based on the neighbor datapoint values (imputation) and filtering of adjacent pixels). Data pre-processing and its effect on machine learning using the described process of imputation has been analyzed, and the impact of different imputation methods may be significant to machine-learning model training and inference. This problem may increase in severity with the growth of the artificial intelligence field.

The following embodiments present the concept of applying mathematical transformations of stored data on-the-fly (e.g., during a read operation) inside the data storage device during a data read. This can include interpolation/extrapolation and threshold comparison. Previously, operations of interpolation, filtering, and other mathematical data processing required host involvement, which can cause additional overhead and may need more computational resources.

In general, while the above embodiments were used to optimize the replacement of specific patterns by marking written replaceable patterns so their on-the-fly replacement in the read path was easily available, in the following embodiments, patterns can be either specific characters, regular expressions, or a predefined bit sequence that is otherwise unused in a structure stored persistently in the data storage device. These embodiments broaden the concept described in the above embodiments to include not only one-to-one datapoints conversions but also allow on-the-fly in-memory manipulations of data that involve several adjacent datapoints.

More specifically, these embodiments can be used to replace missing values (i.e., NANs) with interpolated values of neighboring data points. Moreover, these embodiments apply data filtering on-the-fly inside the data storage device during reading of data from its memory. These embodiments utilize the fact that the controller of the data storage device maps physical memory to logical addresses in a way that allows contiguous tracking of related datapoints and offline imputation based on similarity.

In one example implementation, the controller 102 of the data storage device 100 can be used for the following embodiments: (1) completion of missing values in a dataset via imputation based on data in nearby logical addresses within the same logical block address (LBA), (2) smoothing/filtering of serial data (e.g., time-series, audio signals, images, video), and (3) producing discrete values from continuous data (e.g., sampling and biasing data based on thresholds from a host-defined range). These embodiments can be used alone or in combination. The relevant data can be either tabular/non-structured data (e.g., for embodiments (1) and (3)) or structured/serial data (e.g., for embodiments (1) and (2)). Embodiments (1) and (2) may require the controller 102 of the data storage device to be aware to the original structure of the data. This can involve cooperation of the host 300 to inform the controller 102 about the format and structure of the data. This notification—together with the accessibility of the controller 102 to the internal logical-to-physical (L2P) address tables—can allow the controller 102 to locate the original neighbor data points for applying the mentioned above interpolation/filtering operations. Methods for communicating such structures to the data storage device 100 are defined in the NVMe Computational Programs Command Specification.

Figure 7:
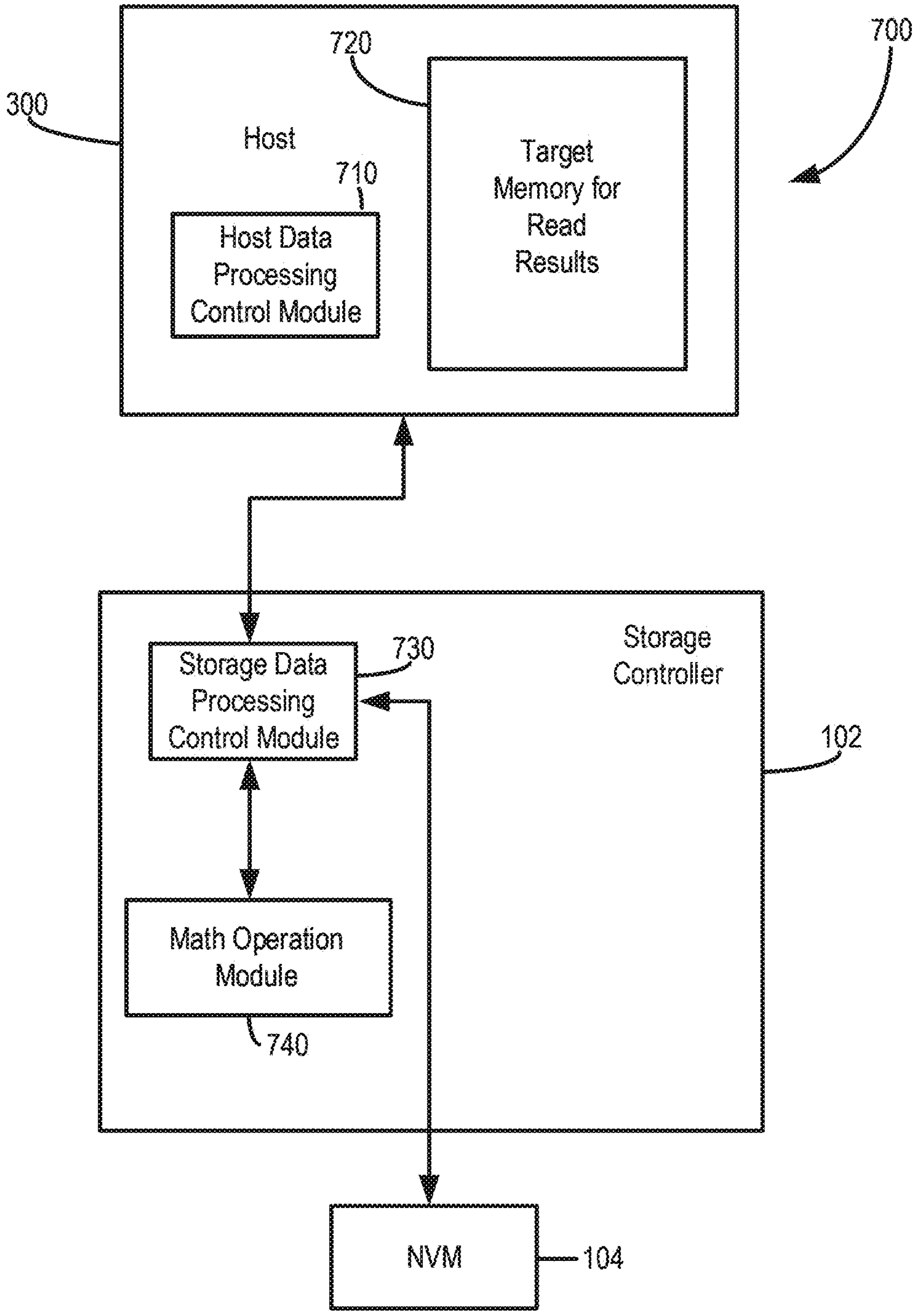
FIG. 7 is an illustration of an architecture of an embodiment.

Turning again to the drawings FIG. 7 is an illustration of an architecture 700 of an embodiment. As shown in FIG. 7, in this embodiment, the host 300 comprises a host data processing control module 710 and a target memory for read results 720. The host's one or more processors 330, individually or in combination, can be used to implement the host data processing control module 710 by executing computer-readable program code/instructions stored in the one or more memories 340 of the host 300. The target memory 720 can be part of the host's one or more memories 340. The controller 102 of the data storage device 100 comprises a storage data processing control module 730 and a math operation module 740. The data storage device's one or more processors 138, individually or in combination, can be used to implement these modules 730, 740 by executing computer-readable program code/instructions stored in a memory of the data storage device 100.

In embodiment (1), imputation of missing data values may be conducted based on a method supplied by the host 300. For example, popular imputation methods include linear interpolation, median, mean, and others. When the host 300 writes this numeric data to the data storage device 100, it can indicate the properties in a set configuration (e.g., how many bits are in each value, what is the fixed-point convention (sign+magnitude, two complement) and other relevant properties). It can also indicate the LBA memory space that belongs to each data value set. The host 300 can indicate to the controller 102 which imputation method it wants to apply to the data, either in this configuration or before reading it. The controller 102 can store a small table (e.g., in the memory 104 or in another memory in the data storage device 100) with the relevant property data. When the host 300 reads the data, the storage data processing control module 730 in the controller 102 can detect that the LBA range is such that numerical imputation is required. The controller 102 can then read the corresponding configuration and use the math operation module 740 to impute the values in the appropriate manner. The process is summarized in the flow chart 800 in FIG. 8.

Figure 8:
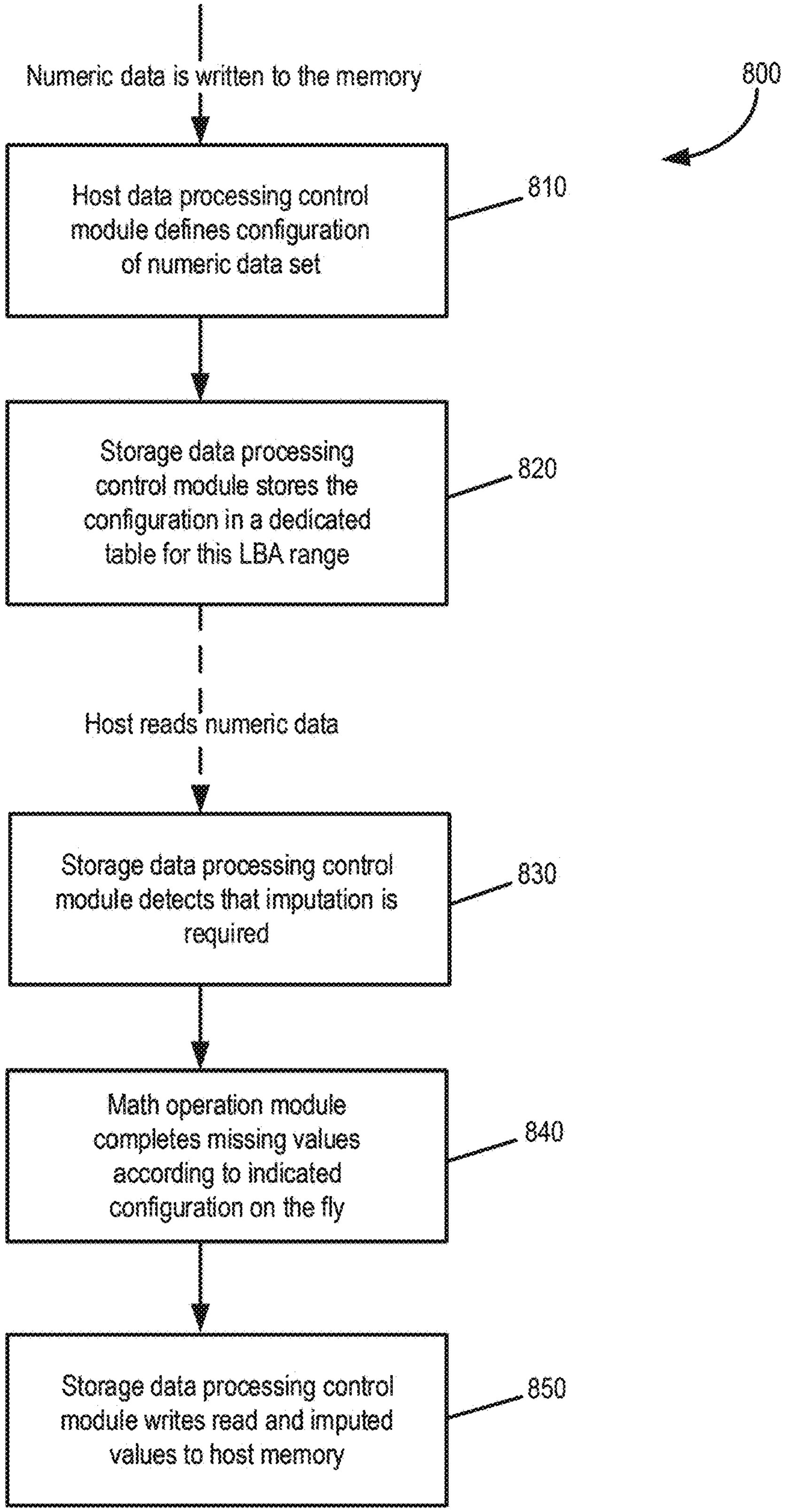
FIG. 8 is a flow chart of a method of an embodiment.

As shown in FIG. 8, when numeric data is written to the memory 104 of the data storage device 100, the host data processing control module 710 defines the configuration for the numeric data set (810). The storage data processing control module 730 then stores the configuration in a dedicated table (or other data structure) for this LBA region (820). When the host 300 reads the numeric data, the storage data processing control module 730 detects that imputation is required (830), and the math operation module 740 completes, on-the-fly, the missing values according to the indicated configuration (840). The storage data processing control module 730 then writes the read-and-imputed values to the target memory 720 in the host 300 (850). In embodiment (2), application of signal processing techniques such as Finite Impulse Response (FIR) filtering, smoothing, and different image processing filters may be conducted (there are generally referred to herein as "filtering"). As with the above embodiment, a configuration supplied by the host 300 can include properties that are relevant to the processing task, such as, but not limited to, expected resolution, filter type, filter coefficients, and input size.

In embodiment (3), discrete values from continuous data (e.g., comparing to thresholds and marking discrete values according to the original value being larger/smaller/inside a pre-defined values range) may be produced and delivered to the host 300. This may be especially useful when a clause is set by the host 300 (e.g. using the Computational Programs Command Set referenced above). For example, the host 300 can send a command to produce all data that is lower than 0 from within a certain dataset. This saves transfers from the controller 102 to the host 300 and saves processing power on the host side. There might be different implementations on how to exactly fill the host memory. One example may be to write 0s to all the spaces where the data would be lower than 0. This effectively implements written_data=max(0,data). Another example may be to leave empty the host memory spaces that are mapped to data that does not fit the clause. In this case, there may also be a need for the host 300 to initialize the memory spaces to some set value, where the controller 102 of the data storage device 100 will overrun these values indicating that the read value is above the threshold. The process is summarized in the flow chart 900 in FIG. 9.

Figure 9:
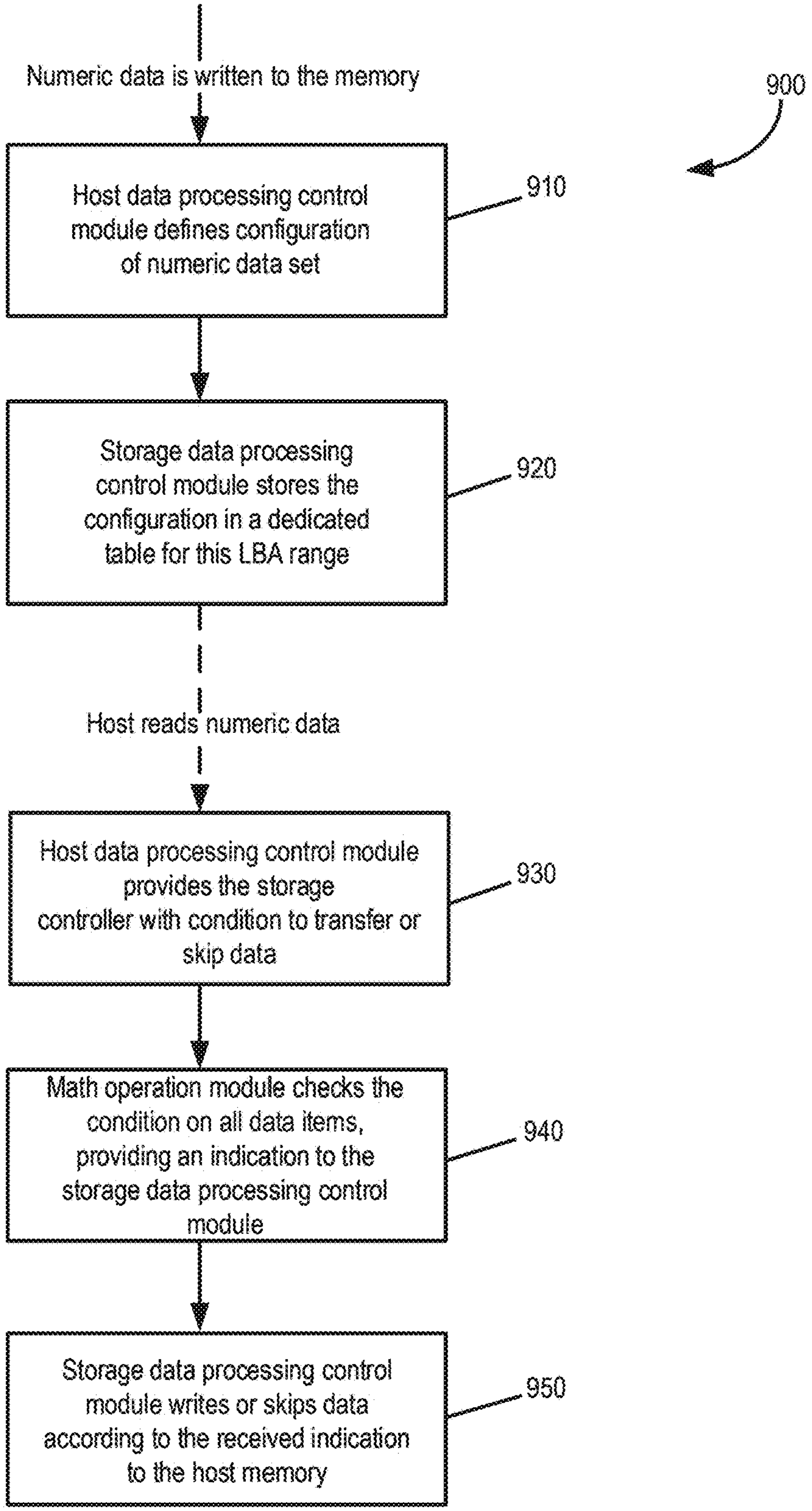
FIG. 9 is a flow chart of a method of an embodiment.

As shown in FIG. 9, when numeric data is written to the memory 104 of the data storage device 100, the host data processing control module 710 defines the configuration for the numeric data set (910). The storage data processing control module 730 then stores the configuration in a dedicated table for this LBA region (920). When the host 300 reads the numeric data, the host data processing control module 710 provides the controller 102 with a condition to transfer or skip data (930). The math operation module 740 checks the condition on all data items and provides an indication to the storage data processing control module 730 (940). The storage data processing control module 730 then writes the data to the host 300 or skips the data according to the received indication to the host memory (950).

There are several advantages associated with these embodiments. For example, these embodiments can be used to reduce power consumption, latency, and host overhead when reading large databases with numerical values. Computational storage is a highly-sought-after field, and the improvements provided by these embodiments are beneficial.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
one or more memories; and
one or more processors, individually or in combination, configured to:
receive, from a host, a data set, a logical address range for the data set, and configuration information;
create a mapping between logical addresses in the logical address range and physical addresses in the one or more memories;
store the data set in the physical addresses in the one or more memories;
store the configuration information in a data structure dedicated to the logical address range;
receive, from the host, a read request and a set of logical addresses; and
in response to the set of logical addresses in the read request being part of the logical address range:
use the mapping between logical addresses in the logical address range and physical addresses in the one or more memories to identify neighboring values of a missing value in the data set;
read the configuration information from the data structure dedicated to the logical address range, wherein the configuration information indicates an imputation method;
perform on-the-fly interpolation using the neighboring values and the imputation method indicated by the configuration information to generate a replacement for the missing value; and
send, to the host, the data set with the replacement for the missing value.

2. The data storage device of claim 1, wherein the interpolation is performed using an interpolation method identified by the host in the configuration information.

3. The data storage device of claim 1, wherein the interpolation is performed using an interpolation method identified by the host in the read request.

4. The data storage device of claim 1, wherein the configuration information further identifies a format of the data set.

5. The data storage device of claim 1, wherein the data set and the configuration information are stored in a same memory of the one or more memories.

6. The data storage device of claim 1, wherein the data set and the configuration information are stored in different memories of the one or more memories.

7. The data storage device of claim 1, wherein the one or more processors, individually or in combination, are further configured to perform a filtering operation on the data set.

8. The data storage device of claim 7, wherein the configuration information further comprises at least one property for the filtering operation.

9. The data storage device of claim 1, wherein the one or more memories comprise a three-dimensional memory.

10. A method comprising:
performing in a data storage device comprising one or more memories:
receiving, from a host, a data set, a logical address range for the data set, and configuration information;
creating a mapping between logical addresses in the logical address range and physical addresses in the one or more memories;
storing the data set in the physical addresses in the one or more memories;
storing the configuration information in a data structure dedicated to the logical address range;

receiving, from the host, a read request and a set of logical addresses; and in response to receiving the set of logical addresses in the read request being part of the logical address range:

using the mapping between logical addresses in the logical address range and physical addresses in the one or more memories to identify neighboring values of a missing value in the data set;

reading the configuration information from the data structure dedicated to the logical address range, wherein the configuration information indicates an imputation method;

performing on-the-fly interpolation using the neighboring values and the imputation method indicated by the configuration information to generate a replacement for the missing value; and sending, to the host, the data set with the interpolated replacement for the missing value.

11. The method of claim 10, further comprising comparing values in the data set to a threshold to produce discrete values from continuous data.

12. The method of claim 10, wherein the interpolation is performed using an interpolation method identified by the host in the configuration information.

13. The method of claim 10, wherein the interpolation is performed using an interpolation method identified by the host in the read request.

14. The method of claim 10, further comprising performing a filtering operation on the data set.

15. The method of claim 10, wherein the on-the-fly interpolation is performed by a math operation module in the data storage device.

16. The method of claim 10, wherein the sending is performed by a storage data processing control module in the data storage device.

17. The method of claim 10, wherein the memory comprises a three-dimensional memory.

18. A data storage device comprising:

one or more memories; and means for:

receiving, from a host, a data set, a logical address range for the data set, and configuration information;

creating a mapping between logical addresses in the logical address range and physical addresses in the one or more memories;

storing the data set in the physical addresses in the one or more memories;

storing the configuration information in a data structure dedicated to the logical address range;

receiving, from the host, a read request and a set of logical addresses; and in response to receiving the set of logical addresses in the read request being part of the logical address range:

using the mapping between logical addresses in the logical address range and physical addresses in the one or more memories to identify neighboring values of a missing value in the data set;

reading the configuration information from the data structure dedicated to the logical address range, wherein the configuration information indicates an imputation method;

performing on-the-fly interpolation using the neighboring values and the imputation method indicated by the configuration information to generate a replacement for the missing value; and sending, to the host, the data set with the interpolated replacement for the missing value.

* * * * *